3,177,247
PREPARATION OF 4-ACETAMIDO-3-NITROBENZOIC ACID
John Malcolm Ross, Wilmington, Del., assignor to E. I. du Pont de Nemours and Company, Wilmington, Del., a corporation of Delaware
No Drawing. Filed Dec. 18, 1962, Ser. No. 245,412
3 Claims. (Cl. 260—518)

This invention relates to an improvement in the preparation of 4-acetamido-3-nitrobenzoic acid.

The heretofore described procedures for the nitration of acetyl-p-aminobenzoic acid lack much detail, but all such processes involve the addition of the 4-acetamidobenzoic acid as a dry powder to fuming nitric acid (that is nitric acid containing 10 or less parts of water). The addition of dry powder to fuming nitric acid is hazardous and although it is possible to carry out such a process on a laboratory scale, carrying out such a process on a commercial scale is dangerous for where large quantities are involved control of such a reaction is difficult and in most cases impossible.

It is an object of this invention to provide a safe and convenient process for the nitration of 4-acetamidobenzoic acid which gives a high yield of a substantially pure 4-acetamido-3-nitrobenzoic acid.

The further object of the invention is to provide a process for producing substantially pure 4-amino-3-nitrobenzoic acid by the nitration of 4-acetamidobenzoic acid followed by hydrolysis of the acetyl group without isolation from the nitration mass.

The process of the present invention comprises adding 4-acetamidobenzoic acid to a nitric acid solution containing 70 to 84 parts by weight of $HNO_3$ and 30 to 18 parts by weight of $H_2O$ which acid will be referred to hereinafter as (70–84% nitric acid).

The addition is carried out at a temperature of 0° to 25° C. The concentration of the nitric acid should not be materially higher than 84% so that nitration does not occur during the addition of the 4-acetamidobenzoic acid to the acid solution. The quantity of acid initially employed to form the slurry above mentioned should be from 2.5 to 6 parts of acid per part of 4-acetamidobenzoic acid and preferably from 2.5 to 3 parts. Too much acid results in too thin a mixture, necessitating unduly large charge sizes, while too little acid gives a slurry too thick to stir and cool properly.

To the above mentioned slurry of the 4-acetamidobenzoic acid concentrated acid is added to raise the nitric acid concentration of the mass to at least 88%, preferably from 89–93% (that is, 89–93 parts by weight of $HNO_3$). The concentrated acid employed in bringing up the nitration mass to the percentages mentioned may be (1) nitric acid of 90–95% concentration, (2) sulfuric acid 95–98%, or (3) mixed acid which comprises a mixture of 100% sulfuric acid and 100% nitric acid, the latter being a commercially available mixture containing 2 parts sulfuric acid and 1 part of nitric acid. The amount of acid to be added in each case is readily calculatable knowing the concentration of the nitric acid in the initial slurry. If sulfuric acid is used consideration is given to the fact that sulfuric acid forms an equimolar hydrate with water. The amount of sulfuric acid to be added is calculated accordingly to raise the concentration of the nitric acid solution to the preferred level of 89 to 93%. Since water is formed during the nitration, these levels are calculated assuming no reaction and will not actually be obtained. The amount of concentrated acid used should be sufficient to assure a concentration of 86–87% nitric acid (not below 85%) in the mass at the end of the nitration reaction, assuming 1 equivalent of water is generated during the reaction.

The temperature of the entire process should be maintained between 5° and 25° C. At higher temperatures the quantity and yield of the desired product are decreased while at too low a temperature the reaction is too slow to be commercially practical.

The time for bringing the $HNO_3$ concentration to 86–87% will of course depend upon the efficiency of cooling in any particular apparatus, and usually the time required to effect the mononitration reaction may vary from 10 minutes to 2 hours. When the reaction is complete, the mass is drowned in ice water, thus precipitating the above 4-acetamido-3-nitrobenzoic acid as a yellow solid. This product may be isolated from the reaction mass by filtering or it may be deacetylated without isolation by warming the aqueous slurry of the 4-acetamido-3-nitrobenzoic acid sufficiently to effect the deacetylation, generally to from 90°–95° C. for one-half to two hours. The slurry is then cooled and the resulting 4-amino-3-nitrobenzoic acid is isolated by filtering.

The following examples are given to more fully illustrate the invention:

Example 1

50 parts of 4-acetamidobenzoic acid are added at 8–12° C. to 144 parts of 83.6% nitric acid. To this slurry is added over a 25 minute period 150 parts of 95% nitric acid (density 1.5) while the temperature is maintained at from 8–12° C. (with external cooling). This reddish-brown solution is stirred for one hour at 8–12° C. then the mass is drowned in 1000 parts ice water and the 4-acetamido-3-nitrobenzoic acid is filtered off as a pale yellow precipitate. It is then washed with 2000 parts of water and dried. It is obtained in a yield of 89% and has a melting point of 212° to 219.5° C., and is of high purity as shown by analysis and by spectra and chromatography studies.

The 4-acetamido-3-nitrobenzoic acid may be hydrolyzed to the 4-amino-3-nitrobenzoic acid without isolation by heating the drowned slurry to a temperature of 90–95° C. for approximately 2 hours. After cooling, the 4-amino-3-nitrobenzoic acid is filtered off, washed with 2000 parts of water and dried. This bright yellow 4-amino-3-nitrobenzoic acid is obtained in high yield. It has a melting point of 287.5–290° C. By analysis it is found to have 25.5 $NO_2$ and 181 N.E. calculated for $C_7H_6N_2O_4$ 25.3 $NO_2$ and 182 N.E.

The nitration of this example may likewise be carried out at from 20–25° C. at which temperature the reaction requires only about 10 minutes to bring it to completion.

Example 2

50 parts of 4-acetamidobenzoic acid are added to 144 parts of 83.6% nitric acid as in Example 1. To this slurry are added at 8–13° C. (with external cooling) over ½ hour, 87.5 parts of mixed acid (67 parts of 100% sulfuric acid and 33 parts of 100% nitric acid). The reddish-brown solution is stirred for an additional ½ hour at 7–9° C. then drowned as in Example 1. The resulting product has a melting point of 212–216° C. when isolated as in Example 1. On hydrolysis the 4-amino-3-nitrobenzoic acid has a melting point of 286–288° C. and is obtained as a bright yellow solid.

Example 3

To a slurry of 50 parts of 4-acetamidobenzoic acid in 144 parts of 83.6% nitric acid are added over a ¾ hour period 92 parts of 96% sulfuric acid while the temperature of the mass is maintained at 10–15° C. The resulting brown solution is stirred for one hour at 10–15° C. then worked up as in Example 1. The resulting 4-acetamido-3-nitrobenzoic acid is obtained as a pale yellow solid having a melting point of 209–215° C.

4-acetamido-3-nitrobenzoic acid is a widely used intermediate for the preparation of other compounds particularly in the preparation of dyes and pharmaceuticals, usually after hydrolyzing off the acetyl group and reducing the nitro group to the corresponding amine.

The yields of the 4-acetamido-3-nitrobenzoic acid obtained by the process of this invention are usually between 85% and 90% and the product is of sufficiently high purity to be used without further purification.

I claim:

1. A process for the preparation of 4-acetamido-3-nitrobenzoic acid which comprises dissolving 4-acetamidobenzoic acid in aqueous nitric acid of from 70 to 84 weight percent, while maintaining the temperature of the mass from 0° to 25° C., then adjusting the nitric acid concentration of the solution to from 89 to 93 weight percent, and maintaining the mass at a temperature of from 0° to 25° C. until mononitration is complete, drowning the mass in water and separating out the 4-acetamido-3-nitrobenzoic acid.

2. A process for the preparation of 4-acetamido-3-nitrobenzoic acid which comprises dissolving 1 part of 4-acetamidobenzoic acid in 2.5 to 3 parts of aqueous nitric acid of from 70 to 84 weight percent, while maintaining the temperature of the mass from 5° to 25° C., then adjusting the nitric acid concentration of the solution to from 89 to 93 weight percent, and maintaining the mass at a temperature of from 0° to 25° C. for from 10 minutes to one hour until mononitration is complete, drowning the mass in water and separating out the 4-acetamido-3-nitrobenzoic acid.

3. A process for the preparation of 4-amino-3-nitrobenzoic acid which comprises dissolving 4-acetamidobenzoic acid in aqueous nitric acid of from 70 to 84 weight percent, while maintaining the temperature of the mass from 0° to 25° C., then adjusting the nitric acid concentration of the solution to from 89 to 93 weight percent, and maintaining the mass at a temperature of from 0° to 25° C. until mononitration is complete, drowning the mass in water and heating the mass to from 90° to 95° C. to effect hydrolysis of the acetamido-group and isolating the resulting 4-amino-3-nitrobenzoic acid.

References Cited by the Examiner

Borel et al.: Helv. Chim. Acta. 36, 801–807 (1953).

LEON ZITVER, *Primary Examiner.*

DANIEL D. HORWITZ, *Examiner.*